(12) United States Patent
Srivastava et al.

(10) Patent No.: US 11,570,171 B2
(45) Date of Patent: Jan. 31, 2023

(54) SYSTEM AND METHOD FOR LICENSE MANAGEMENT OF VIRTUAL APPLIANCES IN A COMPUTING SYSTEM

(71) Applicant: VMWARE, INC., Palo Alto, CA (US)

(72) Inventors: Gaurav Srivastava, Bangalore (IN); Syed Anwar, Bangalore (IN); Soumik Biswas, Bangalore (IN); Shashank Jain, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 727 days.

(21) Appl. No.: 16/454,097

(22) Filed: Jun. 27, 2019

(65) Prior Publication Data

US 2020/0344229 A1     Oct. 29, 2020

(30) Foreign Application Priority Data

Apr. 26, 2019    (IN) .............................. 201941016734

(51) Int. Cl.
| | | |
|---|---|---|
| H04L 9/40 | (2022.01) | |
| G06F 9/455 | (2018.01) | |
| G06F 21/10 | (2013.01) | |
| H04L 41/0806 | (2022.01) | |
| H04L 67/10 | (2022.01) | |

(52) U.S. Cl.
CPC ...... *H04L 63/0876* (2013.01); *G06F 9/45558* (2013.01); *G06F 21/105* (2013.01); *H04L 41/0806* (2013.01); *G06F 2009/45587* (2013.01); *G06F 2009/45595* (2013.01); *G06F 2221/0704* (2013.01); *G06F 2221/0779* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,809,648 | B2* | 10/2010 | Misra ..................... | G06Q 30/06 |
| | | | | 705/59 |
| 2002/0165979 | A1* | 11/2002 | Vincent ................... | H04L 67/14 |
| | | | | 709/239 |
| 2012/0072995 | A1* | 3/2012 | Crawford ................ | G07C 9/22 |
| | | | | 726/26 |
| 2015/0020069 | A1* | 1/2015 | Patani ................. | G06F 9/45533 |
| | | | | 718/1 |
| 2016/0224989 | A1* | 8/2016 | Lissounov .............. | G06F 21/10 |
| 2019/0005205 | A1* | 1/2019 | Dargar .................. | G06F 21/121 |
| 2019/0318063 | A1* | 10/2019 | Wierzba ................ | G06F 21/105 |
| 2020/0034172 | A1* | 1/2020 | Wu ........................ | G06F 21/105 |

* cited by examiner

*Primary Examiner* — Scott B Christensen
(74) *Attorney, Agent, or Firm* — Loza & Loza, LLP

(57) ABSTRACT

System and computer-implemented method for license management of virtual appliances in a computing system uses an activated virtual appliance in the computing system to forward an activation license from a license server on behalf of an unactivated virtual appliance in the computing system.

20 Claims, 5 Drawing Sheets

SYSTEM AND METHOD FOR LICENSE MANAGEMENT OF VIRTUAL APPLIANCES IN A COMPUTING SYSTEM

RELATED APPLICATIONS

Benefit is claimed under 35 U.S.C. 119(a)-(d) to Foreign Application Serial No. 201941016734 filed in India entitled "SYSTEM AND METHOD FOR LICENSE MANAGEMENT OF VIRTUAL APPLIANCES IN A COMPUTING SYSTEM", on Apr. 26, 2019, by VMWARE, Inc., which is herein incorporated in its entirety by reference for all purposes.

BACKGROUND

License management in a computing system typically involves distributing activation licenses from at least one license sever to components of the computing system. In some implementations, the components of the computing system and the corresponding license server are located in different networks within the computing system. For example, in a hybrid cloud system, a license server may be deployed in a public network while components of the computing system may be deployed in a private enterprise network.

In some license management schemes, an end user in a multi-tier provider space trying to activate a component only has access to a tier above and does not have access to the root tier of the multi-tier provider space. In such license management schemes, each tier in the multi-tier provider space needs to implement a user interface to distribute license information to the following tier of the multi-tier provider space, which can increase the cost for license management implementation.

SUMMARY

System and computer-implemented method for license management of virtual appliances in a computing system uses an activated virtual appliance in the computing system to forward an activation license from a license server on behalf of an unactivated virtual appliance in the computing system.

A computer-implemented method for license management in a computing system in accordance with an embodiment of the invention comprises identifying an unactivated virtual appliance in the computing system that is paired with an activated virtual appliance in the computing system, requesting an activation license from a license server in the computing system by the activated virtual appliance on behalf of the unactivated virtual appliance and forwarding the activation license from the activated virtual appliance to the unactivated virtual appliance for activation in the computing system. In some embodiments, the steps of this method are performed when program instructions contained in a computer-readable storage medium are executed by one or more processors.

A system in accordance with an embodiment of the invention includes memory and one or more processors configured to identify an unactivated virtual appliance in a computing system that is paired with an activated virtual appliance in the computing system, request an activation license from a license server in the computing system by the activated virtual appliance on behalf of the unactivated virtual appliance and forward the activation license from the activated virtual appliance to the unactivated virtual appliance for activation in the computing system.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
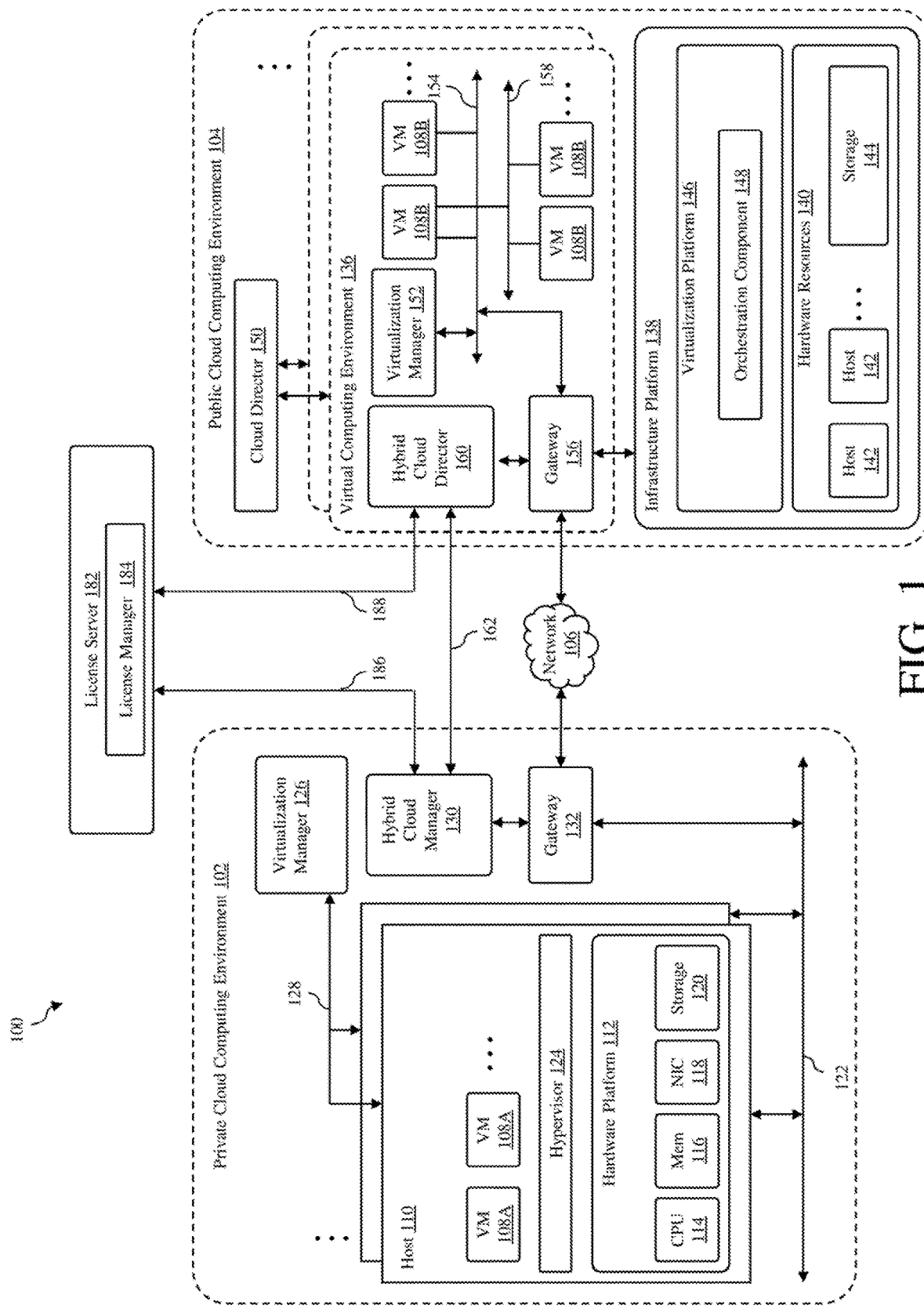
FIG. 1 is a block diagram of a computing system in accordance with an embodiment of the invention.

Turning now to FIG. 1, a block diagram of a computing system 100 in accordance with an embodiment of the invention is shown. The computing system may be a hybrid cloud computing system, which includes at least one private cloud computing environment 102, at least one public cloud computing environment 104 that is connected to the private cloud computing environment 102 via a network 106 and a license server 108. The computing system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center. The network 106 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and HyperSCSI. The license server 108 may be located within the private cloud computing environment, the public cloud computing environment or anywhere in the network 106.

The private and public cloud computing environments 102 and 104 of the computing system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

In some embodiments, the computing system 100 supports migration of the virtual machines 108 between the private and public cloud computing environments 102 and 104. The computing system may also support migration of the virtual machines between different sites situated at different physical locations, which may be computing environments in the private and/or public cloud computing environments.

As shown in FIG. 1, the private cloud computing environment 102 of the computing system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor is configured to execute instructions, for example, executable instructions that perform one or more operations described herein and may be stored in the system memory and/or the storage system. In some embodiments, the system memory is volatile memory used for retrieving programs and processing data. The system memory may include, for example, one or more random access memory (RAM) modules. The network interface enables the host to communicate with another device via a communication medium, such as a network 122 within the private cloud computing environment. The network interface may be one or more network adapters, also referred to as a Network Interface Card (NIC). The storage system represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, which run concurrently on the same host. The virtual machines run on top of a software interface layer, which is referred to herein as a hypervisor 124, that enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager is a computer program that resides and executes in a computer system, such as one of the hosts, or in a virtual computing instance, such as one of the virtual machines 108A running on the hosts. One example of the virtualization manager is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In one embodiment, the private cloud computing environment 102 includes a hybrid cloud manager 130 configured to manage and integrate computing resources provided by the private cloud computing environment with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In some embodiments, the hybrid cloud manager is a virtual appliance, which is a collection of software applications or services residing and operating in a preconfigured virtual environment or platform, such as a virtual machine. In one implementation, the hybrid cloud manager is a module or plug-in to the virtualization manager 126, although other implementations may be used, such as a separate computer program executing in any computer system or running in a virtual machine in one of the hosts. One example of the hybrid cloud manager is the VMware® Hybrid Cloud Extension (HCX) HCX™ product made available from VMware, Inc.

In one embodiment, the hybrid cloud manager 130 is configured to control network traffic into the network 106 via a gateway device 132, which may include a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the computing system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment 104 includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage systems 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one gateway device 156, as well as one or more isolated internal networks 158 not connected to the gateway device 156. The gateway device 156, which may include a virtual appliance, is configured to provide the virtual machines 108B and other components in the virtual computing environment with connectivity to external devices, such as components in the private cloud computing environment via the network 106. The gateway device 156 operates in a similar manner as the gateway device 132 in the private cloud computing environment.

In one embodiment, each of the virtual computing environments 136 in the public cloud computing environment 104 includes a hybrid cloud director 160 configured to communicate with the corresponding hybrid cloud manager 130 in the private cloud computing environment 102 to enable a common virtualized computing platform between the private and public cloud computing environments. In some embodiments, the hybrid cloud manager is a virtual appliance, which includes a collection of applications or services. The hybrid cloud director may communicate with the hybrid cloud manager 130 using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director may be a component of the HCX-Cloud product and the hybrid cloud manager may be a component of the HCX-Enterprise product, which is provided by VMware, Inc.

The license server 182 may be located in the private cloud environment 102, the public cloud computing environment 104 or elsewhere in the computing system 100. The license server may run on at least one host computer, which may be similar to or same as the hosts 110 in the private cloud computing environment 102 and/or the hosts 142 in the public cloud computing environment 104. In an embodiment, the license server communicates with the hybrid cloud manager 130 of the private cloud computing environment using a direct connection 186. However, in other embodiments, the license server communicates with the hybrid cloud manager through an indirect connection, or through a combination of direct and indirect connections. In an embodiment, the license server also communicates with the hybrid cloud director 160 of the public cloud computing environment using a direct connection 188. However, in other embodiments, the license server communicates with the hybrid cloud director through an indirect connection or a combination of direct and indirect connections. In the embodiment depicted in FIG. 1, the license server includes a license manager 184 configured to perform a license management operation. The license server may be a hybrid cloud command and control (C&C) to manage one or more hybrid cloud computing environments in the computing system 100. The license management operation that is performed in the computing system 100 depicted in FIG. 1 involves distributing activation licenses from the license manager 184 to components (e.g., virtual appliances) of the computing system and activating some or all of these components, which may reside in the private cloud computing environment and/or the public cloud computing environment. In some implementations, the components being activated and the license server are located in different networks within the computing system.

In some existing license management schemes, an end user in a multi-tier provider space trying to activate a component only has access to a tier above and does not have access to the root tier of the multi-tier provider space. In such license management schemes, each tier in the multi-tier provider space needs to implement a user interface to distribute license information to the following tier of the multi-tier provider space, which can increase the cost for license management implementation.

In contrast, as explained in detail below, the computing system 100 identifies an unactivated virtual appliance in the computing system that is paired with an activated virtual appliance in the computing system, requests an activation license from the license server in the computing system by the activated virtual appliance on behalf of the unactivated virtual appliance and forwards the activation license from the activated virtual appliance to the unactivated virtual appliance for activation in the computing system. Consequently, the computing system 100 allows an activated component in the computing system to request an activation license from the license server 182 on behalf of an unactivated component in the computing system. Compared to an activation scheme in which each tier in a multi-tier provider space implements a user interface to distribute license information to the following tier in the multi-tier provider space, using a component that is activated in the computing system to request an activation license on behalf of an unactivated component in the computing system allows the unactivated component to obtain the activation license without a direct user interface between the unactivated component and a license server (e.g., the license server 182). Consequently, the amount of time for obtaining the activation license and/or the cost for license management implementation can be reduced.

Figure 2:
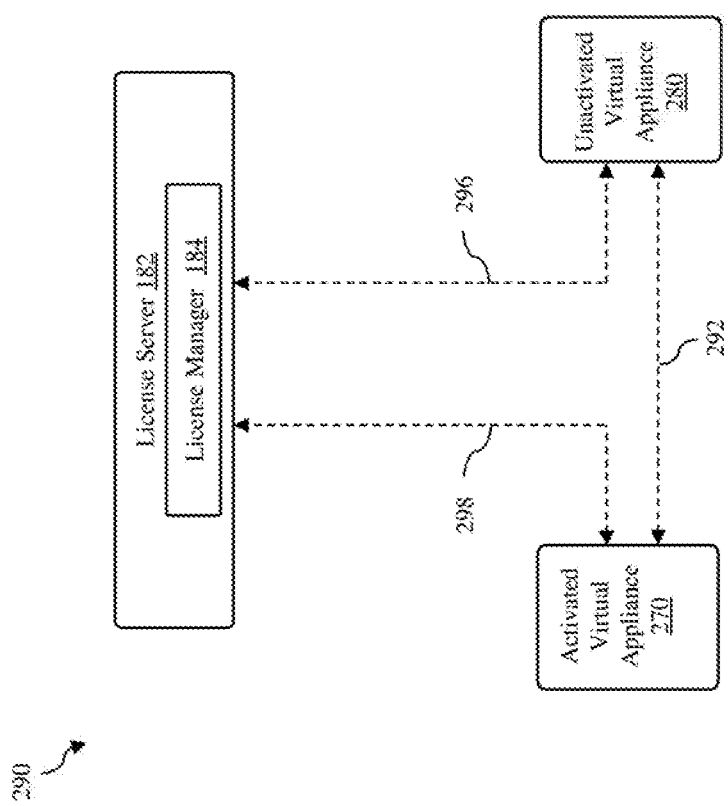
FIG. 2 shows an example of a license server with a license manager, an activated virtual appliance and an unactivated virtual appliance in the computing system, which can be involved in a license management operation in accordance with an embodiment of the invention.

The license management operation performed in the computing system 100 will be described using an example illustrated in FIG. 2, which shows the license server 182 with the license manager 284 and two components 270, 280 of the computing system 100. In this example, the component 270 is an activated virtual appliance and the component 280 is an unactivated virtual appliance 280. Other components of the computing system are not shown in FIG. 2 to not obscure the inventive features of the invention. In some embodiments, each of the license server, the activated virtual appliance and the unactivated virtual appliance is located in a different network within the computing system 100. For example, the license server is located in a first network within the computing system, the activated virtual appliance is located in a second network within the computing system and the unactivated virtual appliance is located in a third network within the computing system. Each of the first, second and third networks may be a private network or a public network within the computing system. In some embodiments, the unactivated virtual appliance is located in the private cloud computing environment 102 depicted in FIG. 1 while the activated virtual appliance and the license server are located in the public cloud computing environment 104 depicted in FIG. 1. In an embodiment, the license server communicates with the unactivated virtual appliance using a direct or indirect connection 296, the license server communicates with the activated virtual appliance using a direct or indirect connection 298 and the unactivated virtual appliance communicates with the activated virtual appliance using a direct or indirect connection 292.

In some embodiments, each of the activated virtual appliance 270 and the unactivated virtual appliance 280 may be a Hybrid Cloud Extension (HCX) product provided by VMware, Inc, such as an HCX manager, an HCX Interconnect Service, a Network Extension Service, or a WAN Optimization Service. The activated virtual appliance may be a network service provider virtual appliance and the unactivated virtual appliance may be a hybrid cloud management virtual appliance. In an embodiment, the activated virtual appliance is the hybrid cloud director 160, which may be a component of the HCX-Cloud product provided by VMware, Inc., and the unactivated virtual appliance is the hybrid cloud manager 130, which may be a component of the HCX-Enterprise product provided by VMware, Inc.

In an embodiment in accordance with the invention, the activated virtual appliance 270 identifies the unactivated virtual appliance 280 in the computing system 100 that is paired with the activated virtual appliance, requests an activation license from the license manager 284 in the license server 282 by the activated virtual appliance on behalf of the unactivated virtual appliance and forwards the activation license to the unactivated virtual appliance for activation in the computing system. In some embodiments, the unactivated virtual appliance is paired with the activated virtual appliance after the activated virtual appliance sends its identification information (e.g., its universally unique identifier (UUID) or system ID) to the activated virtual appliance, for example, in an API call and a token is transmitted from the activated virtual appliance to the unactivated virtual appliance. In an embodiment, the activated virtual appliance acts as an authenticated end for the license manager, and requests an activation license from the license manager on behalf of the unactivated virtual appliance 280 using at least one credential of the activated virtual appliance. Examples of the credentials of the activated virtual appliance include, without being limited to, a system ID of the activated virtual appliance, a network address of the activated virtual appliance, and an access code assigned to the activated virtual appliance. The activated virtual appliance can request an activation license on behalf of the unactivated component using its credential, which can reduce the amount of time for obtaining the activation license and/or reduce the cost for license implementation. In some embodiments, the license manager 284 issues the same activation license to the activated virtual appliance and to the unactivated virtual appliance that is paired with the activated virtual appliance.

Figure 3:
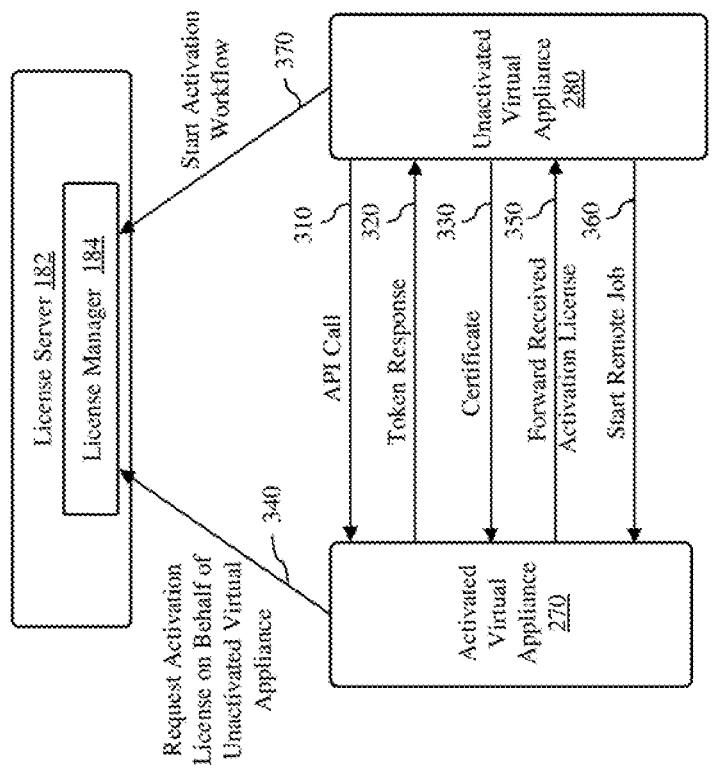
FIG. 3 is a flow diagram illustrating the license management operation in accordance with an embodiment of the invention using the example of FIG. 2.

The license management operation performed in the computing system 100 in accordance with an embodiment of the invention will now be described in detail using the example of FIG. 2 with reference to a process flow diagram shown in FIG. 3. As illustrated in FIG. 3, the license management operation begins at step 310, where an Application programming interface (API) call is received at the activated virtual appliance 270 from the unactivated virtual appliance 280. Based on the API call, the activated virtual appliance identifies that the unactivated virtual appliance is not activated by the license server 282. An example of the API call in accordance with an embodiment of the invention is shown below.

{"certificate": "*****", "uuid": "20180726054335068-b631ad35-ef47-4b7da9d1-4acaab583 ee0", "getActivationDetails":true}

As shown above, the API call includes the universally unique identifier (UUID) of the unactivated virtual appliance 280 and a data field for allowing or deny proxy activation through the activated virtual appliance 270, which is set to true (i.e., allowing the activated virtual appliance to obtain an activation license for the unactivated virtual appliance 280 and forward the activation license to the unactivated virtual appliance).

After the activated virtual appliance 270 identifies that the unactivated virtual appliance 280 has not been activated by the license manager 284 of the license server 282, the activated virtual appliance requests an activation license from the license server 282 based on identification information (ID) of the unactivated virtual appliance. At step 320, a token response is transmitted from the activated virtual appliance to the unactivated virtual appliance. In some embodiments, the token response contains a session token. For example, the API call in step 310 may be a credential based call. Once the credentials are validated at the activated virtual appliance 270, the activated virtual appliance 270 sends a session token. At step 330, a certificate message is transmitted to the activated virtual appliance from the unactivated virtual appliance. In some embodiments, the unactivated virtual appliance sends its system ID as a part of the payload of a certificate message. For example, the unactivated virtual appliance sends its identification information as a part of the JavaScript Object Notation (JSON) payload of a POST certificate message. If a virtual appliance being paired with the activated virtual appliance is already activated, the virtual appliance does not send its identification information (e.g., its system ID) to the activated virtual appliance and a fetch activation license workflow from the activated virtual appliance to the license server is not triggered. In some embodiments, an interface is provided by the computing system 100 to a user to select whether or not the unactivated virtual appliance can be activated through the activated virtual application with which the unactivated virtual appliance is paired such that a user can selectively activate unactivated virtual appliances under the same subscription as an activated virtual appliance or in a different subscription as the activated virtual appliance. At step 340, a request for an activation license for the unactivated virtual appliance 280 is transmitted from the activated virtual appliance 270 to the license manager 284 of the license server 282. The request for the activation license for the unactivated virtual appliance may include identification information (e.g., a system ID) of the unactivated virtual appliance. An example of a request from the activated virtual appliance to the license server for an activation license in accordance with an embodiment of the invention is shown below.

{"pairedApplianceId":"20180726054335068-b631ad35-ef47-4b7da9d1-4acaab583ee0"}

As shown above, the request from the activated virtual appliance to the license server includes a paired appliance identification data field, which is the UUID of the unactivated virtual appliance 280.

The license manager 284 of the license server 282 then verifies whether or not the request is received from an activated virtual appliance to prevent unauthorized requests from unactivated virtual appliances. In some embodiments, the license manager verifies an appliance type of the activated virtual appliance 270. The license manager may also generate an activation license for the unactivated virtual appliance 280 based on identification information (e.g., a system ID) of the unactivated virtual appliance. In some embodiments, the license manager generates an activation license for the unactivated virtual appliance based on the system ID of the unactivated virtual appliance under the same subscription as the activated virtual appliance. In some embodiments, the license manager allows the activated virtual appliance to invoke an API to fetch an activation license for the unactivated virtual appliance. The API can check the activation method by which the activated virtual appliance is activated. If the activated virtual appliance is activated by an activation key, the license server generates a new activation key and sends it to the activated virtual appliance. Alternatively, if the activated virtual appliance is activated using a license file, the license server returns the same license file for the unactivated virtual appliance. Consequently, a customer can be assured that a single license file is used for activating all virtual appliances. An example of a success response from the license server in response to a request for an activation license in accordance with an embodiment of the invention is shown below.

{"success": true, "data":{\"activationLicense\": \"XXXXXXXXXXXXXXXXXXXXXXXX\"}}.

As shown above, the success response includes a data field that specifies a successful activation operation and activation license information. An example of a failure response from the license server in response to a request for an activation license in accordance with an embodiment of the invention is shown below.

{"success": false, "errors":[{\"text\":\"API call allowed only for HCX Cloud appliances.\"}]}

As shown above, the failure response includes a data field that specifies an unsuccessful activation operation and a message "API call allowed only for HCX Cloud appliances," which specifies that the license server only accepts API calls from the activated virtual appliance 270, which may be an HCX cloud virtual appliance. Another example of a failure response from the license server in response to a request for an activation license in accordance with an embodiment of the invention is shown below.

{"success": false, "errors":[{\"text\":\"Paired appliance already activated.\"}]}

As shown above, the failure response includes a data field that specifies an unsuccessful activation operation and a message "Paired appliance already activated," which states that the virtual application paired with the activated virtual appliance 270 is already activated.

After the activated virtual appliance 270 receives an activation license from the license manager 284 of the license server 282, the activated virtual appliance forwards the received activation license to the unactivated virtual appliance 280, at step 350. An example of a success response to the unactivated virtual appliance in accordance with an embodiment of the invention is shown below.

{"success": true, "completed": true, "data":{\"activationDetails\":{\"url\": \"connect. hcx.vmware.com\",\"activationKey\":\"XXXXXXXXXXXXXXXXXXXXXXXX\" } } }

As shown above, the success response includes a data field that specifies a successful activation operation, a data field that specified the completion of the license application and data fields with activation license information. An example of a failure response to the unactivated virtual appliance in accordance with an embodiment of the invention is shown below.

{"success": false, "completed": true,"errors":[{\"text\": \"Certificate is not provided\" }]}

As shown above, the failure response includes a data field that specifies an unsuccessful activation operation, a data field that specified the completion of the license application and a message "Certificate is not provided," which indicates that the unactivated virtual application fails to provide a required certificate. The unactivated virtual appliance may store the activation license for future use. In some embodiments, the unactivated virtual appliance stores the activation license in an application configuration file. In case that the activation of the unactivated virtual appliance fails, the activation license persists in the application configuration file and activation can be retried without additional information.

After the unactivated virtual appliance 280 receives the activation license, the unactivated virtual appliance starts a remote job with the activated virtual appliance 270 and begins activation workflow with the license manager 284 of the license server 282 using the activation license, either sequentially or concurrently with the remote job execution. At step 360, a remote job is initiated by the unactivated virtual appliance and started at the activated virtual appliance 270. At step 370, which is either sequentially or concurrently with step 360, an activation workflow is established from the unactivated virtual appliance to the license server in order to activate the unactivated virtual appliance using the activation license. In some embodiments, another activation license is provided to the unactivated virtual appliance by, for example, a user. In these embodiments, the unactivated virtual appliance starts an activation workflow with the license server using the activation license that is provided by the user. In these embodiments, the license server does not activate the unactivated virtual appliance using the activation license that is previously generated by the license server. Instead, the license server activates the license server using the activation license that is provided by the user. The license server may remove the activation license that is previously generated by the license server from its record in order to prevent duplicate activation.

A license management operation performed in the computing system 100 in accordance with another embodiment of the invention is described with reference to a process flow diagram shown in FIG. 4. The difference between the license management operation illustrated in FIG. 4 and the license management operation illustrated in FIG. 3 is that, in the operation illustrated in FIG. 4, the virtual appliances being paired with each other may be both activated, both unactivated or a combination of activated and unactivated.

Figure 4:
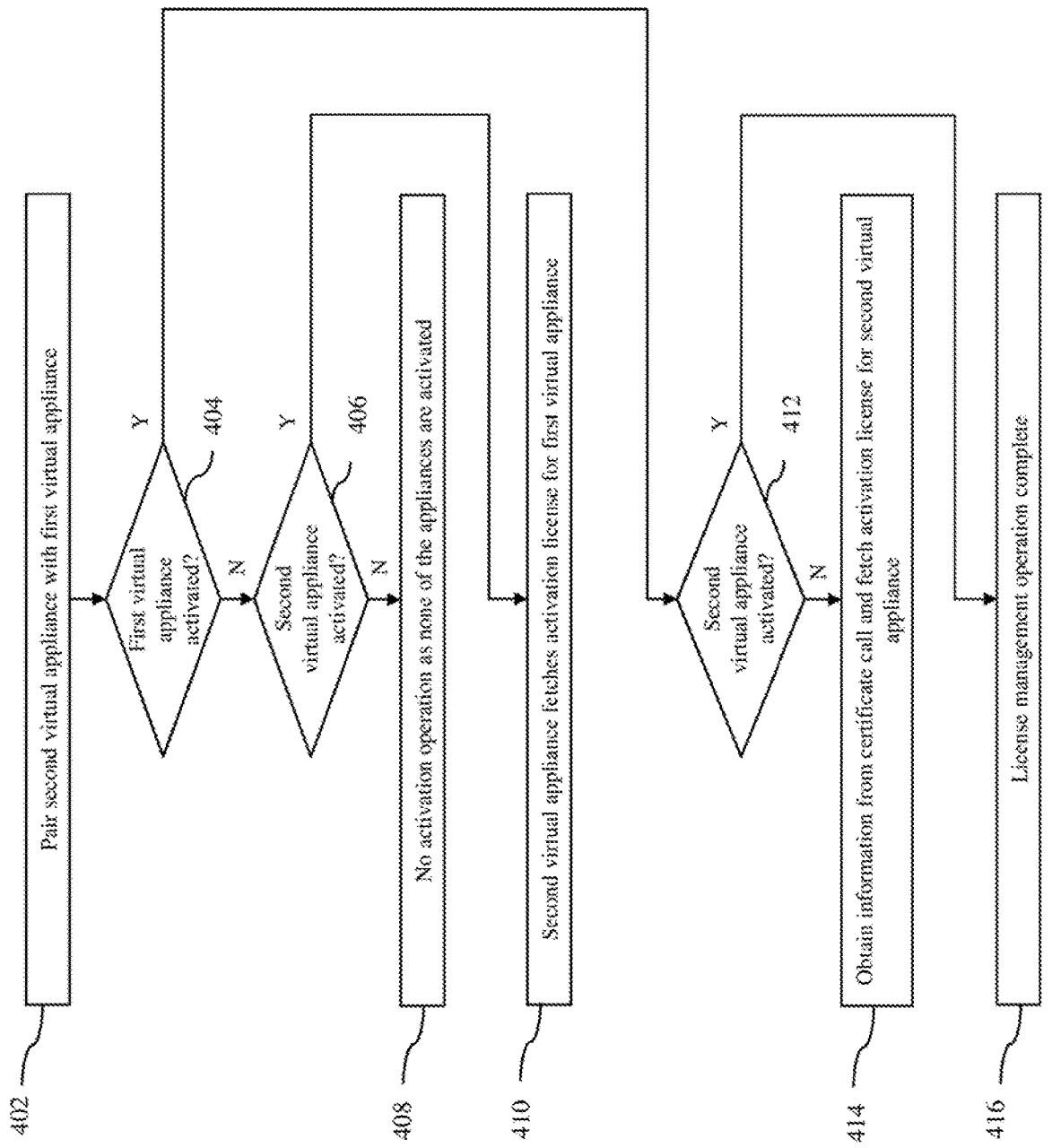
FIG. 4 is a process flow diagram of a license management operation in the computing system in accordance with another embodiment of the invention.

As illustrated in FIG. 4, at block 402, a second virtual appliance is paired with a first virtual appliance. Next at block 404, a determination is made whether the first virtual appliance is activated, for example, by the license manager 284 of the license server 282. If not (i.e., the first virtual appliance is not activated), then the operation proceeds to block 406, where a determination is made whether the second virtual appliance is activated, for example, by the first virtual appliance. If not (i.e., the second virtual appliance is not activated), the operation proceeds to block 408 where no virtual application activation operation will take place. In particular, the first virtual appliance will not request/fetch an activation license from a license server (e.g., the license server 282 of FIG. 2) on behalf of the second virtual appliance and the second virtual appliance will not request/fetch an activation license from a license server on behalf of the first virtual appliance. If yes (i.e., the second virtual appliance is activated), the operation proceeds to block 410 where the second virtual appliance requests/fetches an activation license from a license server (e.g., the license server 282 of FIG. 2) on behalf of the first virtual appliance.

Going back to the determination block 404, if yes (i.e., the first virtual appliance is activated), then the operation proceeds to block 412, where a determination is made whether the second virtual appliance is activated, for example, by the first virtual appliance. If not (i.e., the second virtual appliance is not activated), the operation proceeds to block 414 where the first virtual appliance obtains information regarding the second virtual appliance from a certificate call and requests/fetches an activation license for the second virtual appliance from a license server (e.g., the license server 282 of FIG. 2) on behalf of the second virtual appliance, similar to the steps 330, 340, 350 of the license management operation illustrated in FIG. 3. If yes (i.e., the second virtual appliance is activated), the operation proceeds to block 416 and the license management operation is completed.

Figure 5:
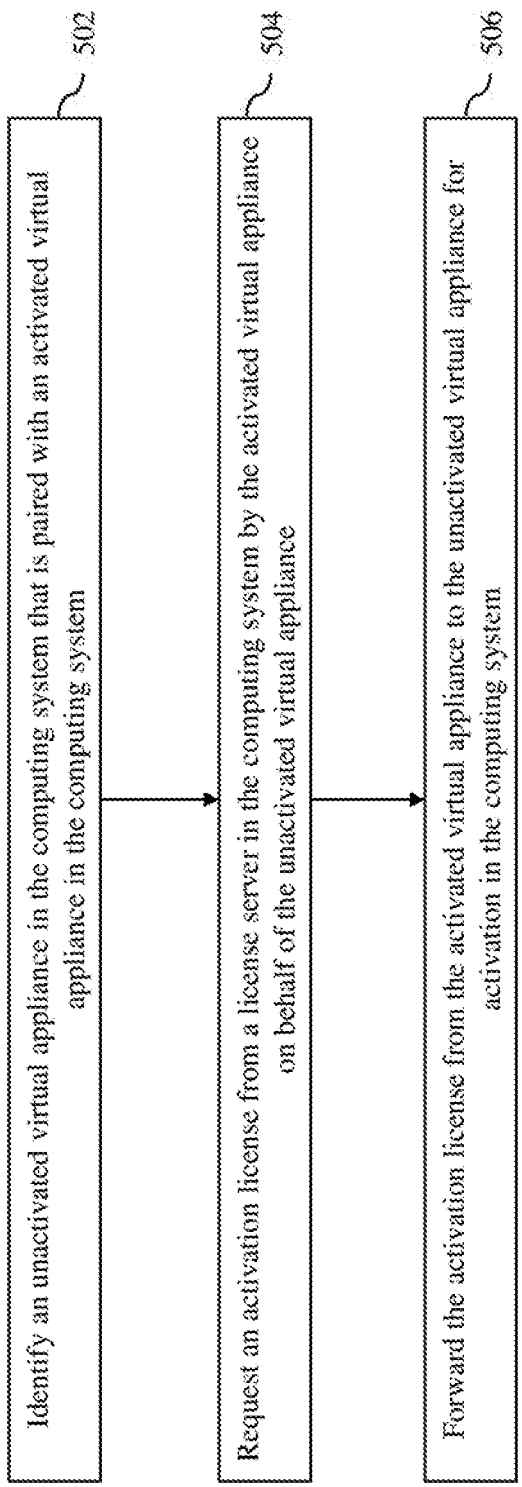
FIG. 5 is a process flow diagram of a computer-implemented method for license management in a computing system in accordance with an embodiment of the invention.

A computer-implemented method for license management of virtual appliances in a computing system in accordance with an embodiment of the invention is described with reference to a process flow diagram of FIG. 5. At block 502, an unactivated virtual appliance in the computing system that is paired with an activated virtual appliance in the computing system is identified. At block 504, an activation license is requested from a license server in the computing system by the activated virtual appliance on behalf of the unactivated virtual appliance. At block 506, the activation license is forwarded from the activated virtual appliance to the unactivated virtual appliance for activation in the computing system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for license management of virtual appliances in a computing system, the method comprising:
    pairing a first virtual appliance and a second virtual appliance in the computing system for a license management operation;
    determining that the first virtual appliance is an activated virtual appliance and the second virtual appliance is an unactivated virtual appliance;
    when the first and second virtual appliances are determined to be an activated virtual appliance and an unactivated virtual appliance, requesting an activation license from a license server in the computing system by the activated virtual appliance on behalf of the unactivated virtual appliance;
    forwarding the activation license from the activated virtual appliance to the unactivated virtual appliance for activation in the computing system; and
    establishing a connection from the unactivated virtual appliance to the license server to activate the unactivated virtual appliance using the activation license.

2. The computer-implemented method of claim 1, wherein each of the unactivated virtual appliance and the activated virtual appliance comprises a plurality of applications or services residing and operating in a preconfigured virtual environment.

3. The computer-implemented method of claim 1, wherein requesting the activation license from the license server in the computing system by the activated virtual appliance on behalf of the unactivated virtual appliance comprises requesting the activation license from the license server in the computing system by the activated virtual appliance using a credential of the activated virtual appliance.

4. The computer-implemented method of claim 1, wherein requesting the activation license from the license server in the computing system by the activated virtual appliance on behalf of the unactivated virtual appliance comprises requesting the activation license from the license server in the computing system by the activated virtual appliance based on identification information of the unactivated virtual appliance.

5. The computer-implemented method of claim 1, wherein the activation license is identical to an activation license that is issued to the activated virtual appliance.

6. The computer-implemented method of claim 1, wherein each of the unactivated virtual appliance, the activated virtual appliance and the license server is located in a different computing environment within the computing system.

7. The computer-implemented method of claim 6, wherein the computing system is a hybrid cloud computing system, wherein the unactivated virtual appliance is located in a private cloud computing environment, wherein the activated virtual appliance is located in a public cloud computing environment.

8. The computer-implemented method of claim 6, wherein at least one of the unactivated virtual appliance and the activated virtual appliance is a hybrid cloud management virtual appliance.

9. A non-transitory computer-readable storage medium containing program instructions for license management of virtual appliances in a computing system, wherein execution of the program instructions by one or more processors causes the one or more processors to perform steps comprising:
    pairing a first virtual appliance and a second virtual appliance in the computing system for a license management operation;
    determining that the first virtual appliance is an activated virtual appliance and the second virtual appliance is an unactivated virtual appliance;
    when the first and second virtual appliances are determined to be an activated virtual appliance and an unactivated virtual appliance, requesting an activation license from a license server in the computing system by the activated virtual appliance on behalf of the unactivated virtual appliance;
    forwarding the activation license from the activated virtual appliance to the unactivated virtual appliance for activation in the computing system; and
    establishing a connection from the unactivated virtual appliance to the license server to activate the unactivated virtual appliance using the activation license.

10. The non-transitory computer-readable storage medium of claim 9, wherein each of the unactivated virtual appliance and the activated virtual appliance comprises a plurality of applications or services residing and operating in a preconfigured virtual environment.

11. The non-transitory computer-readable storage medium of claim 9, wherein requesting the activation license from the license server in the computing system by the activated virtual appliance on behalf of the unactivated virtual appliance comprises requesting the activation license from the license server in the computing system by the activated virtual appliance using a credential of the activated virtual appliance.

12. The non-transitory computer-readable storage medium of claim 9, wherein requesting the activation license from the license server in the computing system by the activated virtual appliance on behalf of the unactivated virtual appliance comprises requesting the activation license from the license server in the computing system by the activated virtual appliance based on identification information of the unactivated virtual appliance.

13. The non-transitory computer-readable storage medium of claim 9, wherein the activation license is identical to an activation license that is issued to the activated virtual appliance.

14. The non-transitory computer-readable storage medium of claim 9, wherein each of the unactivated virtual appliance, the activated virtual appliance and the license server is located in a different computing environment within the computing system.

15. The non-transitory computer-readable storage medium of claim 14, wherein the computing system is a hybrid cloud computing system, wherein the unactivated virtual appliance is located in a private cloud computing environment, wherein the activated virtual appliance is located in a public cloud computing environment.

16. A system comprising:
memory; and
one or more processors configured to:
pair a first virtual appliance and a second virtual appliance in the computing system for a license management operation;
determine that the first virtual appliance is an activated virtual appliance and the second virtual appliance is an unactivated virtual appliance;
when the first and second virtual appliances are determined to be an activated virtual appliance and an unactivated virtual appliance, request an activation license from a license server in the computing system by the activated virtual appliance on behalf of the unactivated virtual appliance;
forward the activation license from the activated virtual appliance to the unactivated virtual appliance for activation in the computing system; and
establish a connection from the unactivated virtual appliance to the license server to activate the unactivated virtual appliance using the activation license.

17. The system of claim 16, wherein each of the unactivated virtual appliance and the activated virtual appliance comprises a plurality of applications or services residing and operating in a preconfigured virtual environment.

18. The system of claim 16, wherein the one or more processors is further configured to request the activation license from the license server in the computing system by the activated virtual appliance using a credential of the activated virtual appliance.

19. The system of claim 16, wherein the one or more processors is further configured to request the activation license from the license server in the computing system by the activated virtual appliance based on identification information of the unactivated virtual appliance.

20. The system of claim 16, wherein the activation license is identical to an activation license that is issued to the activated virtual appliance.

* * * * *